United States Patent
Wilson et al.

(10) Patent No.: US 6,727,014 B1
(45) Date of Patent: Apr. 27, 2004

(54) FUEL CELL REACTANT AND COOLING FLOW FIELDS INTEGRATED INTO A SINGLE SEPARATOR PLATE

(75) Inventors: James D. Wilson, Brooklyn, NY (US); Arthur Kaufman, West Orange, NJ (US)

(73) Assignee: H Power Corporation, Belleville, NJ (US)

( * ) Notice: Subject to any disclaimer, the term of this patent is extended or adjusted under 35 U.S.C. 154(b) by 399 days.

(21) Appl. No.: 09/928,719

(22) Filed: Aug. 13, 2001

(51) Int. Cl.[7] .................................. H01M 8/04
(52) U.S. Cl. ..................... 429/26; 429/32; 429/34; 429/38; 429/39; 429/19; 429/20; 429/13
(58) Field of Search ................. 429/32, 26, 19, 429/20, 34, 38, 39, 13

(56) References Cited

U.S. PATENT DOCUMENTS

| | | | | |
|---|---|---|---|---|
| 5,952,119 A | * | 9/1999 | Wilson | 429/34 |
| 6,117,577 A | * | 9/2000 | Wilson | 429/17 |
| 6,150,049 A | * | 11/2000 | Nelson et al. | 429/39 |
| 6,303,245 B1 | * | 10/2001 | Nelson | 429/34 |
| 6,406,807 B1 | * | 6/2002 | Nelson et al. | 429/13 |

* cited by examiner

*Primary Examiner*—Bruce F. Bell
(74) *Attorney, Agent, or Firm*—Mark Levy & Associates

(57) ABSTRACT

A fuel cell having a novel configuration including a segmented gas diffusion medium (GDM) or a non-segmented GDM and a separator plate, in which the reactant flow field and liquid coolant field are integrated into one side of a single plate element. The separator plate, in one embodiment, allows for the hydration of the polymer electrolyte membrane of the fuel cell.

26 Claims, 4 Drawing Sheets

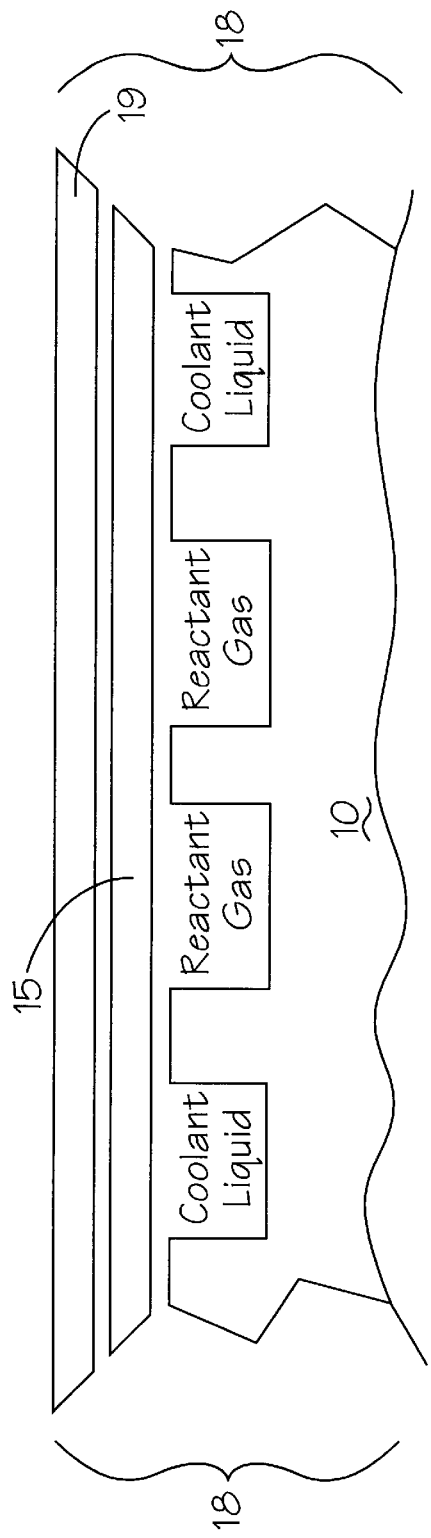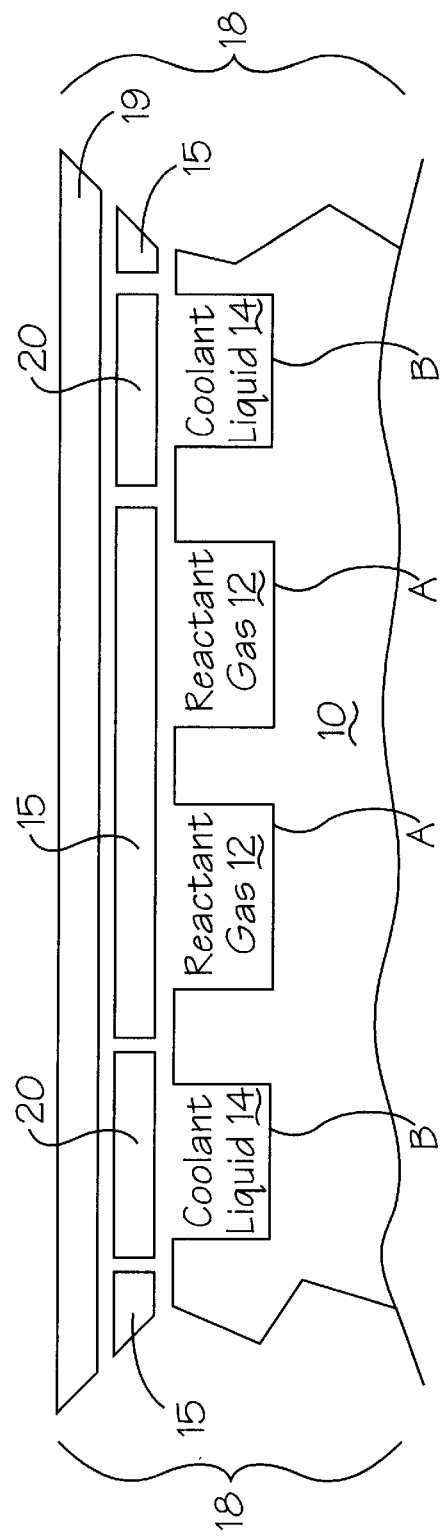

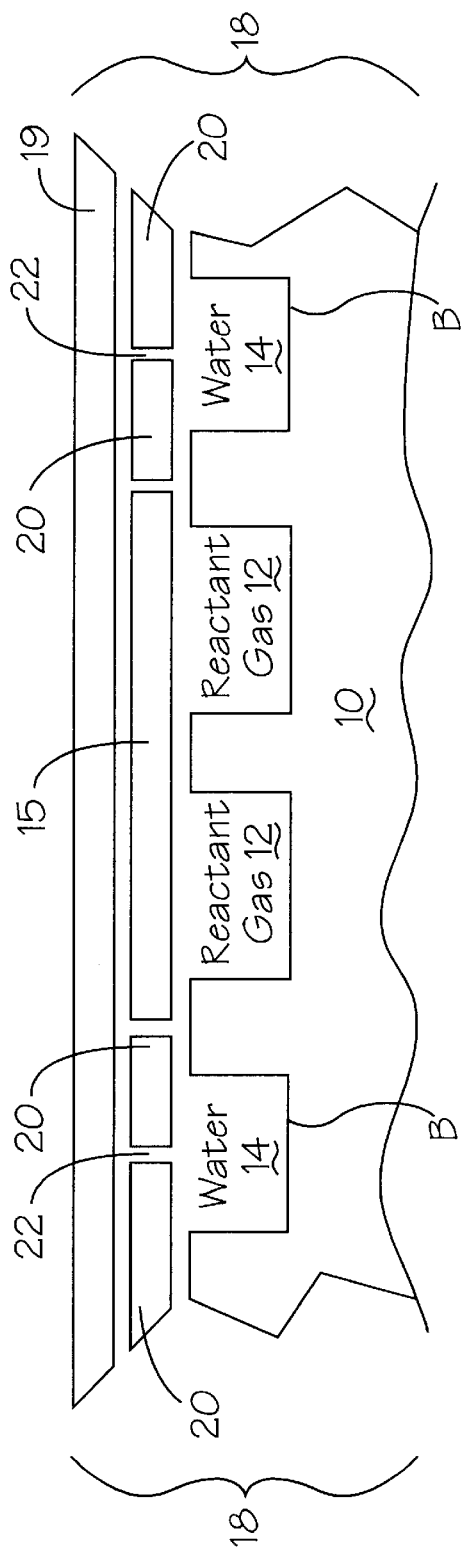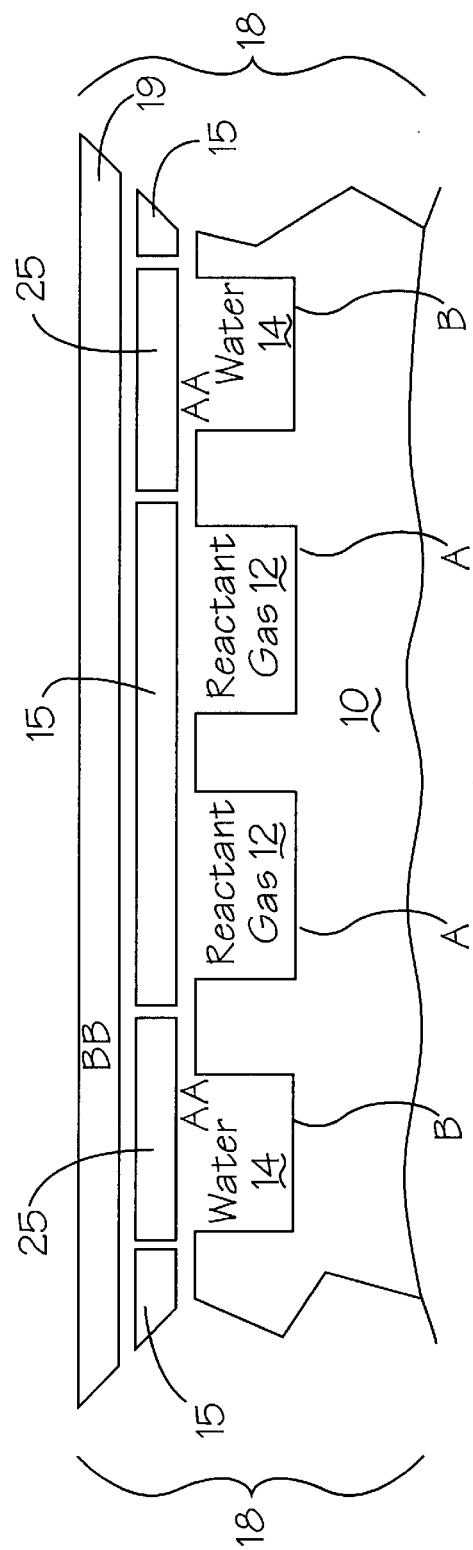

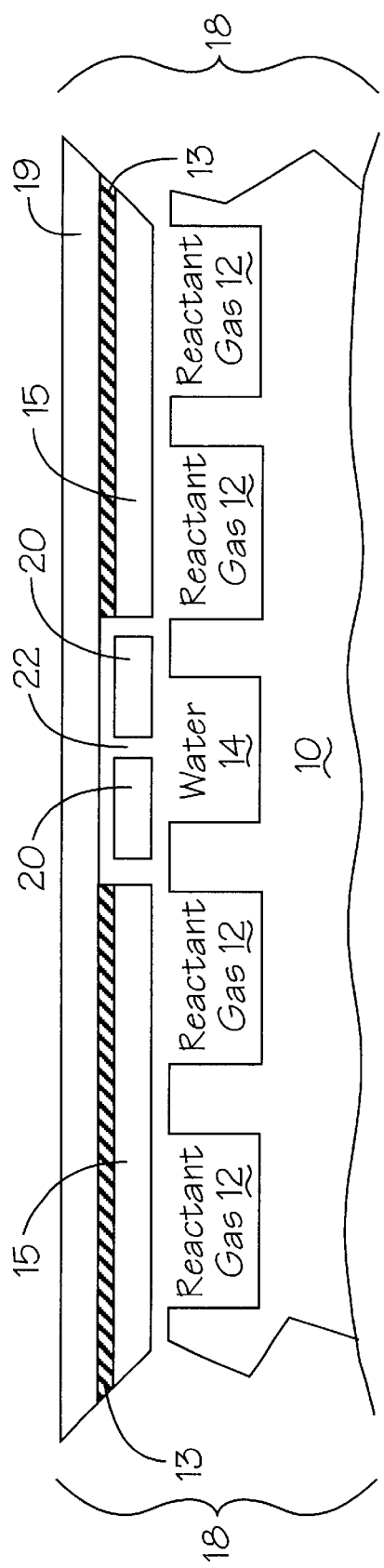
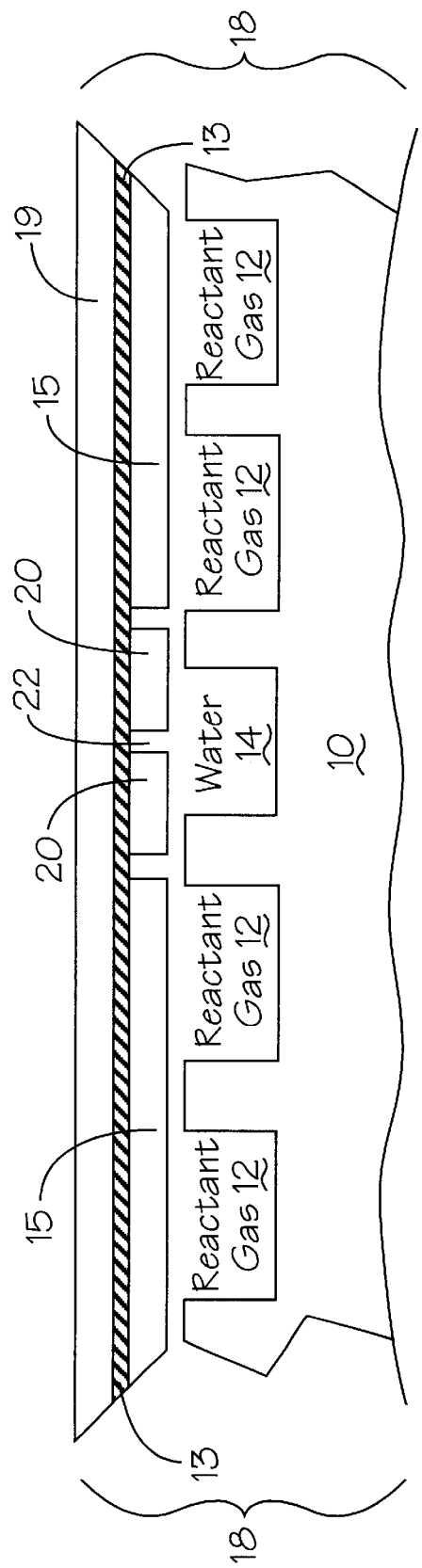

US 6,727,014 B1

FUEL CELL REACTANT AND COOLING FLOW FIELDS INTEGRATED INTO A SINGLE SEPARATOR PLATE

FIELD OF THE INVENTION

The present invention relates to fuel cells and, more particularly, to a fuel cell separator plate in which the reactant and cooling flow fields are integrated into a single plate. An optional segmented gas diffusion medium may permit the reactant and cooling functions of the cell to be effectively segregated, and also may permit direct hydration of the membrane of the fuel cell.

BACKGROUND OF THE INVENTION

High current density (and therefore high power density) operation of fuel cell stacks produces a large amount of heat. It is necessary to remove this generated heat in order to operate efficiently. Historically, this has been accomplished by circulating cooling fluid through a plurality of cooling plates that are interspersed evenly throughout the fuel cell stack. These plates are dedicated solely to the cooling function.

A major drawback of employing these plates is the added complexity to the system, and an increase in the number of stack components, resulting in an increase of the cost of fabrication.

Additionally, efficient operation at high current densities and/or operation at high temperatures (critical for CO-tolerance), may require that the water content of the polymer electrolyte membrane be maintained. Historically, this has been achieved by pre-humidifying one or both of the fuel cell reactant gases so that the un-reacted gases do not dry out the membrane as they leave the stack.

Unfortunately, such pre-humidification in practice adds a layer of engineering complexity, cost, and sometimes even additional parasitic power consumption. These drawbacks reduce the attractiveness of the fuel cell system as an alternative power source.

The present invention seeks to provide an improved fuel cell that eliminates all of the aforementioned problems.

The fuel cell of this invention features a new type of design that permits integration of cooling the fuel cell and reactant flow functions into a single, separating plate element.

As aforementioned, power efficiency and high temperature operability are both dependent on maintaining the water content of the electrolyte membrane. The segmented gas diffusion medium (GDM) in one embodiment of this invention, however, permits direct membrane hydration, getting the water or water solution directly to the electrolyte membrane in the gaps between the GDM segments, but simultaneously keeping it away from where it is not wanted. Thus, the water is prevented from interfering with the reactant flow field and the GDM.

SUMMARY OF THE INVENTION

In accordance with the present invention, there is provided a modified separator plate and associated manifolding. The separator plate integrates the reactant flow function and cooling flow function of a fuel cell into a single separating element. An additional embodiment features a segmented GDM that is constructed to provide direct hydration to the polymer electrolyte membrane. This is achieved by one of two methods. The first method consists of putting the water or water solution coolant flow field in direct contact with the immediately adjacent membrane, by providing a gap in the gasket disposed between the coolant flow field and the electrolyte membrane.

An alternative of the above approach provides the second method. The membrane hydration can be accomplished by use of a microporous wicking material disposed between the membrane and the coolant flow field of the separator plate. The wick, while being microporous enough to serve as an effective obstacle to bulk water flow, has water transport properties that are superior to those of the membrane. This results in an increase in the rate of water transfer to areas of the membrane that are electrochemically active. Both of the aforementioned hydration methods accomplish the hydration of the electrolytic membrane without exposing liquid water to the GDM or to the reactant gas flow fields.

It is an object of this invention to provide an improved fuel cell.

It is a further object of this invention to provide a fuel cell that integrates the cooling and reactant flow functions into a single plate.

It is another object of this invention to provide an unsegmented GDM and modified separator plate with provisions for predominantly containing cooling water within its flow field in the adjacent modified separator plate.

It is another object of the invention to provide a fuel cell having a modified separator plate and an optional, segmented GDM for use in integrating the cooling and reactant flow functions into a single separator plate.

It is yet a further object of this invention to provide a segmented GDM and modified separator plate for a fuel cell stack that provides direct hydration to the electrolytic membrane.

BRIEF DESCRIPTION OF THE DRAWINGS

A complete understanding of the present invention may be obtained by reference to the accompanying drawings, when considered in conjunction with the subsequent detailed description, in which:

FIG. 2 shows a cross-sectional, schematic view of one side of the separator plate shown in FIG. 1, along with its adjacent, non-segmented gas diffusion medium and the electrolyte membrane (electrocatalyst not shown), not involving hydration of the electrolyte membrane;

FIG. 3 depicts a cross-sectional, schematic view of another embodiment not involving hydration of the electrolyte membrane, but whereby a gasket is employed at cooling water channels to prevent leakage of liquid into the adjacent gas diffusion medium;

FIG. 4 illustrates a cross-sectional, schematic view of a first embodiment of one side of the separator plate depicted in FIG. 3, along with its adjacent gas diffusion medium and the electrolyte membrane (electrocatalyst not shown), which has been modified to allow the direct hydration of the electrolyte membrane;

FIG. 5 depicts a cross-sectional, schematic view of a second embodiment of the one side of the separator plate depicted in FIG. 3, along with its adjacent gas diffusion medium and the electrolyte membrane (electrocatalyst not shown), which has been modified to allow the direct hydration of the electrolyte membrane;

FIG. 6 is a cross-sectional view of an alternative embodiment of one side of a separator plate having an electrocatalyst deposited on the gas diffusion medium layer; and FIG. 7 is a cross-sectional view of another embodiment with the electrocatalyst deposited on the electrolyte membrane.

For purposes of clarity and brevity, like elements and components of the invention shall bear the same numbering and designations throughout the figures.

DESCRIPTION OF THE PREFERRED EMBODIMENT

Figure 1:
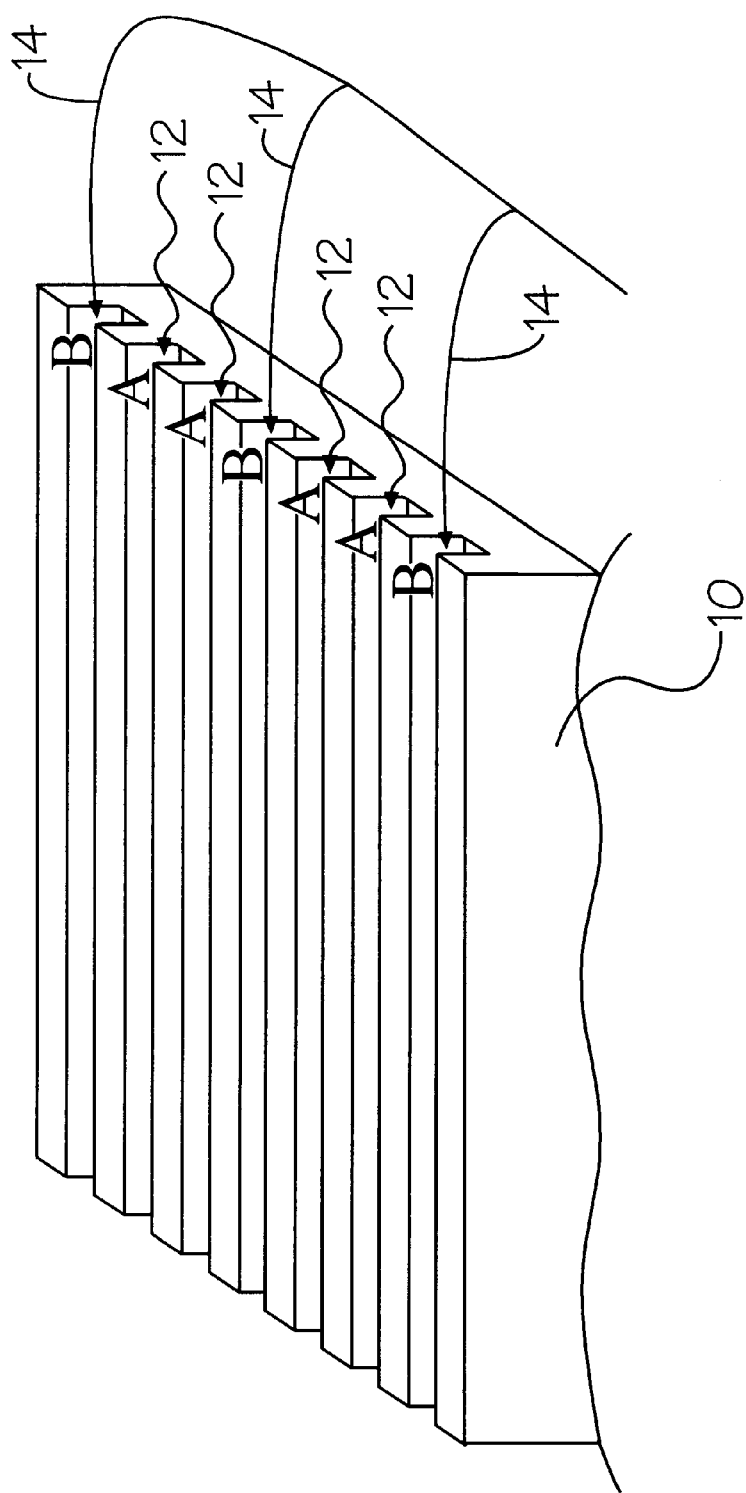
FIG. 1 illustrates a perspective, schematic view of one side (air or fuel) of the fuel cell separator plate of this invention.

Generally speaking, the invention features a fuel cell configuration having a novel separator plate and segmented GDM, in which the reactant (air or fuel) flow field and liquid coolant field are integrated into a single plate element. The separator plate and segmented GDM in this embodiment also allow for the hydration of the polymer electrolyte membrane of the fuel cell.

Now referring to FIG. 1, there is shown a perspective, schematic view of one side (air or fuel) of one of the separator plates 10 of the fuel cell stack (not shown) of this invention. The separator plate 10 incorporates the flow of reactant gas and coolant water in the fuel cell stack. It will be observed that the reactant gas, shown by multiple streams 12, flows through the respective channels marked "A", while the coolant liquid streams 14 flow through the channels designated "B". Plate 10 is easily fabricated using processes such as machining, molding, or stamping. Combining the gas distribution and cooling functions into a single stack element lowers the cost of the overall fuel cell system and provides greater compactness (i.e., reduces the size of the stack).

Referring to FIG. 2, a cross-sectional, schematic view of a section 18 of a fuel cell is shown with one side of the separator plate 10 depicted in FIG. 1. The separator plate is shown adjacent a GDM 15. In this embodiment, a porous electrocatalyst (not shown; cf. FIG. 6) for the fuel cell reaction is deposited on the opposite surface of the GDM 15 and is in contact with the electrolyte membrane 19. Gas diffusion media 15 are porous structures. These media 15 will not generally serve as barriers between the coolant and reactant fluids where a pressure gradient between the coolant liquid and the reactant gas exists. To prevent the coolant liquid from interfering with fuel cell operation and/or to prevent reactant gas from escaping into the coolant liquid loop, a barrier between these fluids must generally be created. Although not shown in FIG. 2, such a barrier can be created through the use of a thin film (e.g., metal or plastic) placed between the water channel 14 and the GDM 15 or by filling the pores of the GDM 15 with material such as a polymer resin at locations adjacent to the water channels 14. An alternative to the use of a polymer resin for filling the pores of the GDM 15 would be the use of a wicking material for this purpose, in which case this material can serve as a means of hydration of the electrolyte membrane 19.

Referring to another embodiment in FIG. 3, the coolant water 14 flowing in channel B of the separator plate 10 is contained by a gasket 20, which is extended across the separator plate 10. The gasket 20 is used to isolate the liquid coolant 14 from the reactant flow 12, and the electrochemically active parts of the fuel cell. As a result, the GDM is no longer contiguous; instead, it is divided into segments and is now a "segmented GDM".

Both of the foregoing alternatives provide for combinations of reactant gas and cooling liquid flow-fields within a single separator plate. It should be understood that the aforementioned designs illustrated in FIGS. 2 and 3 show one side of separator plate 10, but the other side thereof can be similarly configured. Such an alternative design is not shown herein in the interest of brevity.

As aforementioned, power efficiency and high temperature operability are both dependent on maintaining the water content of the electrolyte membrane 19. The segmented GDM 15, however, lends itself to a more controlled approach to direct membrane hydration, by positioning the water or water solution 14 directly in contact with the membrane 19, without intruding upon the reactant flow 12 and upon the GDM 15.

Referring to FIG. 4, the gasket 20 is shown having an opening or gap 22 that extends channel B, thus allowing the water coolant 14 to directly contact the immediately adjacent membrane 19. Thus, the membrane 19 is hydrated by the water flow in channel B.

Referring to FIG. 5, an alternative of the membrane hydration configuration shown in FIG. 4 incorporates a microporous wicking material. The wick 25 is micorporous enough to serve as an effective obstacle to bulk water flow, but its in-plane water transport properties are superior to those of the membrane 19. This results in an increased rate of water transport from points AA to points BB.

FIG. 6 specifically illustrates the porous electrocatalyst layer 13 in the embodiment whereby it is deposited on the GDM 15. In this figure, the configuration shown corresponds to that of FIG. 4, which employs a gap in the gasketing that seals off the water channels 14. However, this depiction of the electrocatalyst layer 13 is representative of all configurations utilizing the electrocatalyst on the GDM 15.

On the other hand, FIG. 7 illustrates the configuration of FIG. 4 whereby the porous electrocatalyst layer 13 is alternatively deposited on the electrolyte membrane 19. Correspondingly, this depiction of the electrocatalyst layer 13 is representative of all configurations utilizing the electrocatalyst on the electrolyte membrane 19. It should be understood that the presence of the porous electrocatalyst 13 on the electrolyte membrane 19 should not constitute a significant barrier to hydration of the electrolyte membrane 19 in long-term operation.

Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A stack configuration for a fuel cell, comprising:
   a segmented gas diffusion medium having spaces between segments thereof;
   a separator plate disposed adjacent the first side of said segmented gas diffusion medium, said separator plate having a plurality of coolant fluid and reactant fluid channels, respectively, at the side adjacent said segmented gas diffusion medium;
   a porous electrocatalyst layer disposed on said gas diffusion medium on the opposite side thereof;
   an electrolyte membrane disposed adjacent said electrocatalyst layer; and
   hydrating means disposed between said electrolyte membrane and said separator plate in said gas diffusion medium spaces, said hydrating means allowing coolant fluid to hydrate said electrolyte membrane, while separating said coolant fluid from said gas diffusion medium and from reactant fluid.

2. The stack configuration in accordance with claim 1, wherein said hydrating means comprises a gasket having a gap that allows coolant fluid from the coolant channels to come into operative contact with said electrolyte membrane.

3. The stack configuration in accordance with claim 1, wherein said spaces contain wicking material.

4. The stack configuration in accordance with claim 3, wherein said wicking material is microporous enough to serve as an effective obstacle to bulk water flow of said coolant fluid, said wicking material having in-plane water transport properties superior to those of said electrolyte membrane.

5. The stack configuration in accordance with claim 1, wherein said electrolyte membrane, comprises a polymer electrolyte membrane.

6. A stack configuration for a fuel cell, comprising:
   a gas diffusion medium having spaces between segments thereof;
   a separator plate disposed adjacent the first side of said gas diffusion medium, said separator plate having a plurality of coolant fluid and reactant fluid channels, respectively, at the side adjacent said segmented gas diffusion medium;
   a porous electrocatalyst layer disposed adjacent and supported by said gas diffusion medium on the opposite side thereof;
   an electrolyte membrane disposed adjacent said electrocatalyst layer; and
   a gasket proximate each of said coolant fluid channels for sealing off coolant fluid disposed therein.

7. The stack configuration in accordance with claim 6, wherein said electrolyte membrane comprises a polymer electrolyte membrane.

8. A stack configuration for a fuel cell, comprising:
   a gas diffusion medium having spaces between segments thereof;
   a separator plate disposed adjacent the first side of said gas diffusion medium, said separator plate having a plurality of coolant fluid and reactant fluid channels, respectively, at the side adjacent said segmented gas diffusion medium;
   an electrolyte membrane being coated by a porous electrocatalyst layer; and
   gasket proximate each of said coolant fluid channels for sealing off coolant fluid disposed therein.

9. A method of operating a stack of a fuel cell, wherein said stack has a configuration comprising: a segmented gas diffusion medium disposed adjacent a separator plate, said separator plate having a plurality of coolant fluid and reactant fluid channels, respectively, at the side adjacent said segmented gas diffusion medium; a porous electrocatalyst layer having two sides, the first of said sides thereof being adjacent an electrolyte membrane, and the opposite side thereof being adjacent and supported by said gas diffusion medium, said method comprising the steps of:
   a) separately flowing reactant and coolant fluids through said separator at the side adjacent said segmented gas diffusion medium;
   b) flowing said reactant fluid into operative contact with said gas diffusion medium; and
   c) disposing said coolant fluid into operative contact with said electrolyte membrane, but precluding direct contact with said gas diffusion medium.

10. The method of operating a stack of a fuel cell in accordance with claim 9, the steps further comprising:
   d) hydrating said electrolyte membrane.

11. A method of operating a stack of a fuel cell, wherein said stack has a configuration comprising: a segmented gas diffusion medium disposed adjacent a separator plate, said separator plate having a plurality of coolant fluid and reactant fluid channels, respectively, at the side adjacent said segmented gas diffusion medium; a porous electrocatalyst layer having two sides, the first of said sides thereof being adjacent and supported by an electrolyte membrane, and the opposite side thereof being adjacent said gas diffusion medium, said method comprising the steps of:
   a) separately flowing reactant and coolant fluids through said separator at the side adjacent said segmented gas diffusion medium;
   b) flowing said reactant fluid into operative contact with said gas diffusion medium; and
   c) disposing said coolant fluid into operative contact with said electrolyte membrane, but precluding direct contact with said gas diffusion medium.

12. The method of operating a stack of a fuel cell in accordance with claim 11, the steps further comprising:
   d) hydrating said electrolyte membrane.

13. The method of operating a stack of a fuel cell in accordance with claim 12, wherein said fuel cell stack further comprises a gasket isolating said coolant fluid within said separator plate from said gas diffusion medium, said gasket having a gap for allowing coolant fluid into contact with said electrocatalyst layer on said porous electrolyte membrane.

14. A method of operating a stack of a fuel cell, said method comprising the steps of:
   a) separately flowing reactant and coolant within flowfields in one side of a common separator plate;
   b) flowing said reactant fluid into operative contact with a gas diffusion medium;
   c) disposing said coolant fluid into operative contact with an electrolyte membrane; and
   d) precluding direct contact of said coolant fluid with said gas diffusion medium.

15. The method of operating a stack of a fuel cell in accordance with claim 14, wherein said step (c) of disposing said coolant fluids into operative contact with an electrolyte membrane comprises the further step of:
   e) wicking said coolant fluid towards said electrolyte membrane.

16. A stack configuration for a fuel cell, comprising:
   separator means for incorporating and separating flow of coolant fluid and reactant fluid within channels at one side of said separator means;
   a gas diffusion medium having two sides, the first of said sides being disposed adjacent said separator means;
   an electrolyte membrane coated by a porous electrocatalyst layer, the opposite side of said gas diffusion medium being adjacent said electrocatalyst layer; and
   hydrating means disposed between said electrocatalyst layer-coated electrolyte membrane and said separator means at spaces alongside segments of said gas diffusion medium, said hydrating means allowing coolant fluid to hydrate said electrolyte membrane, while effectively separating said coolant fluid from said gas diffusion medium and from said reactant fluid.

17. A stack configuration for a fuel cell in accordance with claim 16, wherein said hydrating means comprises a wicking material.

18. A stack configuration for a fuel cell in accordance with claim 16, wherein said hydrating means comprises a gasket isolating said coolant fluid within said separator means from said gas diffusion means, wherein said gasket has a gap for allowing coolant fluid into contact with said electrocatalyst layer-coated electrolyte membrane.

19. A stack configuration for a fuel cell in accordance with claim 16, wherein said electrolyte membrane comprises a polymer electrolyte membrane.

20. A method of operating a stack of a fuel cell, said method comprising the steps of:
   a) separately flowing reactant and coolant within flow-fields at one side of a common separator plate;
   b) flowing said reactant fluid into operative contact with a non-segmented gas diffusion medium; and
   c) precluding contact of said coolant fluid with said non-segmented gas diffusion medium by means of a strip covering said coolant fluid flow-field elements.

21. The method of operating a stack of a fuel cell in accordance with claim 20, wherein said non-segmented gas diffusion medium is coated with a porous electrocatalyst layer.

22. The method of operating a stack of a fuel cell in accordance with claim 20, wherein said fuel cell stack further comprises an electrolyte membrane coated with a porous electrocatalyst layer.

23. The method of operating a stack of a fuel cell in accordance with claim 20, wherein said gas diffusion medium comprises resin-filled pores at locations where said gas diffusion medium comes into contact with coolant fluid flow-field elements and wherein said gas diffusion medium is coated with a porous electrocatalyst layer.

24. The method of operating a stack of a fuel cell in accordance with claim 20, wherein said gas diffusion medium comprises resin-filled pores at locations where said gas diffusion medium comes into contact with coolant fluid flow-field elements and wherein said fuel cell stack further comprises an electrolyte membrane coated with a porous electrocatalyst layer.

25. A stack configuration for a fuel cell, comprising:
   a unitary gas diffusion medium having a plurality of pores, said pores being filled with wicking material at predetermined locations;
   a separator plate adjacent said gas diffusion medium, said separator plate having a plurality of coolant fluid and reactant fluid channels at one of its sides;
   an electrolyte membrane;
   a layer of electrocatalyst coated on one side of said gas diffusion medium; and
   hydrating means disposed between said electrolyte membrane and said separator plate for allowing coolant fluid to hydrate said electrolyte membrane via said wicking material, while preventing direct flow of said coolant fluid into said gas diffusion medium in regions designated for reactant fluid diffusion.

26. A stack configuration for a fuel cell, comprising:
   a unitary gas diffusion medium having a plurality of pores, said pores being filled with wicking material at predetermined locations;
   a separator plate adjacent said gas diffusion medium, said separator plate having a plurality of coolant fluid and reactant fluid channels at one of its sides;
   an electrolyte membrane;
   a layer of electrocatalyst coated on one side of said electrolyte membrane; and
   hydrating means disposed between said electrolyte membrane and said separator plate for allowing coolant fluid to hydrate said electrolyte membrane via said wicking material, while preventing direct flow of said coolant fluid into said gas diffusion medium in regions designated for reactant fluid diffusion.

* * * * *